(No Model.) 2 Sheets—Sheet 1.

J. D. PADGITT.
RIDING SADDLE.

No. 542,940. Patented July 16, 1895.

WITNESSES:
Jos. A. Ryan
Amos W. Hart

INVENTOR
Jesse D. Padgitt

BY Munn & Co.
ATTORNEYS.

(No Model.) 2 Sheets—Sheet 2.

J. D. PADGITT.
RIDING SADDLE.

No. 542,940. Patented July 16, 1895.

WITNESSES:
Jos. A. Ryan
Amos W. Hart

INVENTOR
Jesse D. Padgitt
BY Munn & Co.
ATTORNEYS.

UNITED STATES PATENT OFFICE.

JESSE D. PADGITT, OF DALLAS, TEXAS, ASSIGNOR TO PADGITT BROTHERS, OF SAME PLACE.

RIDING-SADDLE.

SPECIFICATION forming part of Letters Patent No. 542,940, dated July 16, 1895.

Application filed May 4, 1895. Serial No. 548,094. (No model.)

*To all whom it may concern:*

Be it known that I, JESSE D. PADGITT, residing at Dallas, in the county of Dallas and State of Texas, have invented a new and useful Improvement in Riding-Saddles, of which the following is a specification.

Riding-saddles having rigid trees extending from pommel to cantle are objectionable from lack of adaptability to horses having backs differing considerably in shape, besides being more or less uncomfortable for some riders. Saddles having flexible tree—that is to say, trees made of a series of layers of solid leather—are also objectionable from the opposite quality—that is to say, from want of due rigidity—whereby they fail to retain their proper shape and are wanting in durability. I have sought to improve upon both these types or forms of saddles by combining a due share of the rigidity of the one with the flexibility of the other. To this end I employ a short rigid tree, which constitutes the front or forked portion of the saddle, and I construct the body and cantle of pieces of thick but duly flexible leather, as hereinafter described.

Figure 1:
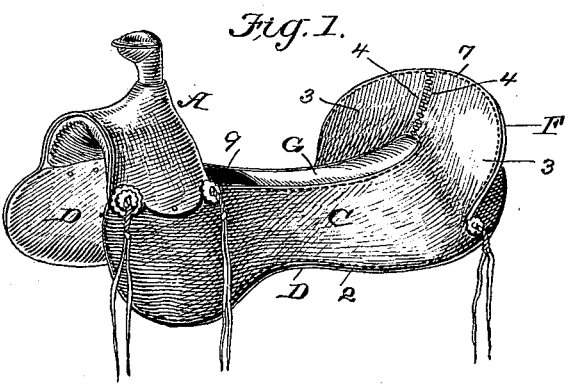
Figure 2:
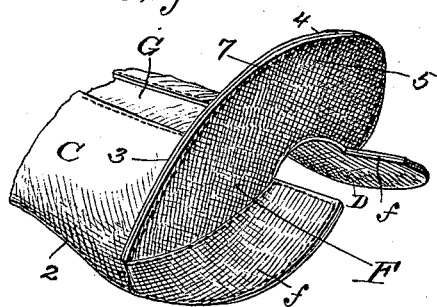
Figure 3:
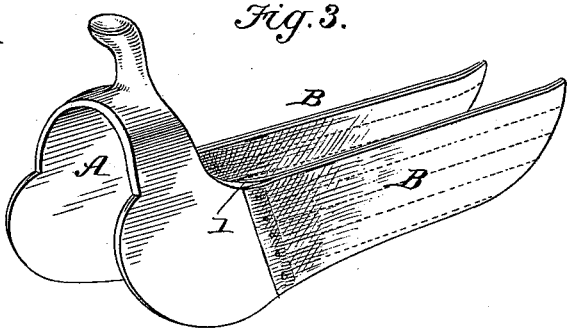
Figure 4:
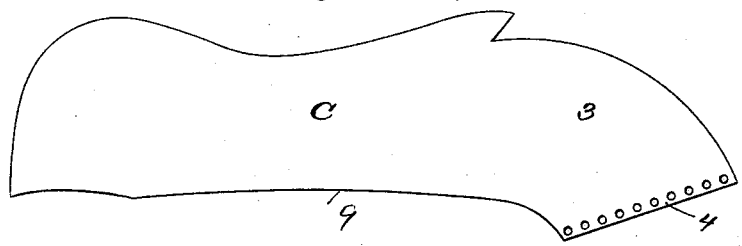
Figure 4:
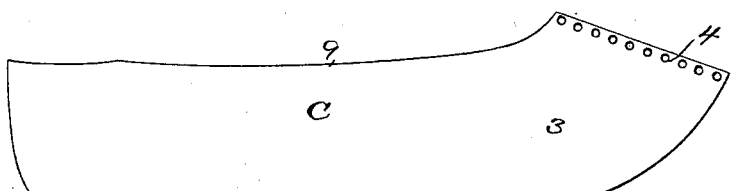
Figure 5:
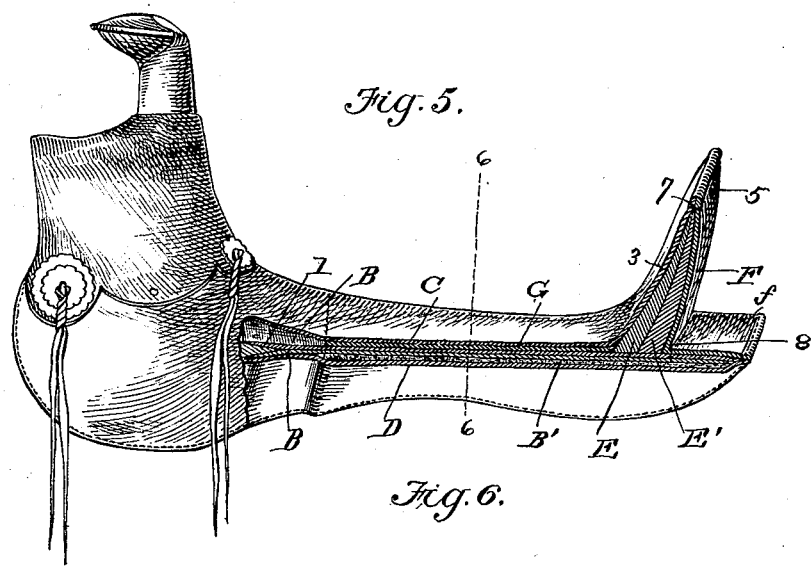
Figure 6:
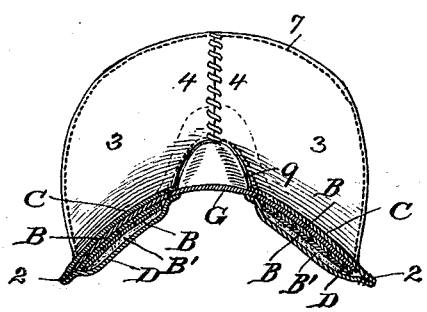
Figure 7:
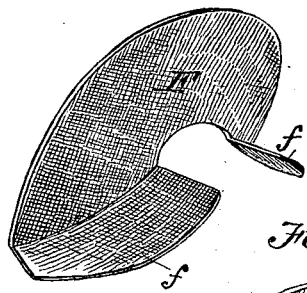
Figure 8:
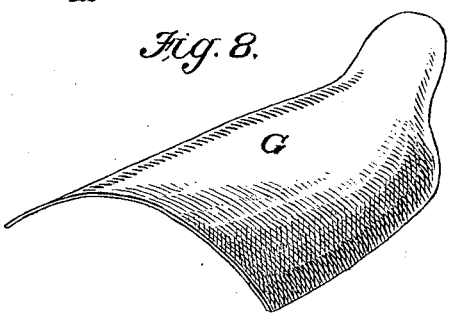
Figure 9:
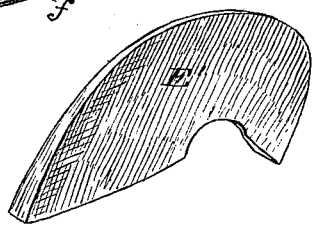

In the accompanying drawings, Figure 1 is a perspective view of my improved saddle. Fig. 2 is an enlarged perspective view of the rear or cantle portion of the saddle. Fig. 3 is a perspective view of the tree and the flexible extension constituting the filling-pieces of the seat portion of the saddle. Fig. 4 is a plan view of the upper finish pieces of the saddle. Fig. 5 is a partly-sectional side view of the saddle. Fig. 6 is a cross-section on line 6 6 of Fig. 5. Fig. 7 is a rear perspective view of the saddle. Fig. 8 is a perspective view of the "strainer." Fig. 9 is a perspective view of one of the cantle filling-pieces.

The short rigid tree A, Fig. 3, may be constructed of wood or any other material suitable for the purpose. The upper portion of this tree and the pommel proper are preferably covered with smooth leather. The tree A extends rearward from the pommel, only to a point just in front of the place where stirrup-straps would normally be attached, and the rear end has a beveled shoulder $l$, to adapt it to form a smooth or scarf-joint with the elongated side pieces B B, Fig. 3, each consisting of two like parts, which are placed in contact flatwise, the same being composed of thick leather and sewed together or otherwise permanently connected. The front ends of such parts B B are attached to the beveled shoulder $l$ of the rigid tree A by means of nails, screws, or laces.

The main outer wear portions of the saddle consist of two smooth leather top pieces and the corresponding under or sweat pieces, Figs. 5 and 6, which latter are in practice in contact with the back of the riding animal. The filling-pieces B B lie between these parts, which also extend over and inclose the arms or lower portions of the rigid tree A. The meeting side edges 2 of the said top pieces C and under pieces D are sewed together, as shown.

From inspection of Fig. 4 it will be noted that the rear ends 3 of the two like top pieces C C are cut at such an angle on the inner sides 4 that when laced together, as shown in Figs. 1 and 6, the parts 3 are drawn up and held self-supported at an angle of about fifty-five degrees and constitute the inner side of the cantle. The latter is stiffened by two pieces E E', Figs. 5 and 9, which are of substantially semicircular form, and laid together flatwise, and by an outside or finish piece F, Fig. 7, which consists of a semicircular part 5 and a bifurcated horizontal rear extension 6, arranged at an acute angle to part 5. The upper or rounded edge of such angular finish-piece F is sewed to the corresponding edge 7 of the cantle portion of the top pieces C, and the lower portion of the same part F is sewed at its angle 8, Figs. 1 and 2, to the lining or filling of the body of the saddle. Between the filling-pieces B and the lower finish pieces C is a layer of felt, which extends from the rear to the point where stirrup-straps are applied. This serves to cushion the saddle where it bears most heavily on the animal.

The saddle is completed by the application of a so-called "strainer" G, Figs. 6 and 8, which extends between the top pieces C C and thus serves not only to cover the slot 9 of the saddle (see Fig. 1) up to the point where the stirrups are in practice attached, but also to firmly brace and firmly connect the main side portions of the saddle. It is arranged differently from other strainers in that its side edges are laid between and sewed to the top and bottom pieces C and D, as shown best in Fig. 6, and thus form no projections on the upper side or seat of the saddle.

By the construction and arrangement of parts before described I form a durable saddle whose front portion is rigid, but whose body and rear portion are flexible, so that they are very comfortable for both horse and rider, and thus possess the advantages without the defects of saddles which are entirely rigid or entirely flexible.

Having thus described my invention, what I claim, and desire to secure by Letters Patent, is—

1. A riding saddle, having a short, rigid tree arranged at its front end, and its body and rear portion formed of leather or other flexible pieces alone, substantially as shown and described.

2. A riding saddle, having a short, rigid tree, flexible leather pieces secured to the rear edge of the same and extending the length of the body of the saddle, to serve as a filling and stiffening therefor, and top and under pieces of leather which are sewed together at their edges and inclose such filling, as shown and described.

3. A riding saddle, having a short, rigid tree whose rear end has a beveled shoulder, as shown, flexible leather pieces which are secured on such shoulder and extend rearward, to form the filling for the body of the saddle, the top and under pieces, which inclose such filling and extend over and cover the arms of said tree, and a leather "strainer," which connects such top and under pieces and lies between and is sewed to the inner edges of the same, as shown and described.

4. A riding saddle, having a short, rigid tree at its front end, and its body and cantle portion consisting solely of leather pieces, the rounded rear ends of the top leather pieces being cut at an angle on their inner sides and secured together as shown and described, whereby such ends are drawn up and form a self-supporting cantle, as specified.

5. In a riding-saddle, the combination, with the leather top pieces, having upwardly-projecting cantle portions, of an angular brace and finish piece which is applied and secured to the rear side of such cantle portion, and extends rearward therefrom, substantially as shown and described.

6. In a riding-saddle, the combination of the acute-angled cantle brace, composed of leather, with the cantle portion of the top-finish leather piece, the under sweat piece, and the leather cantle filling, which is inclosed and secured between the cantle portions of the finish pieces, as shown and described.

7. The improved riding-saddle, composed of a short, rigid tree, the leather side extensions, or filling pieces, secured thereto, the top finish pieces, of leather, having rounded cantle portions which are secured together and project upward at an angle, the under sweat pieces, and the angular leather cantle brace secured to the top and under pieces, as shown and described.

JESSE D. PADGITT.

Witnesses:
N. W. GODBOLD,
W. C. PADGITT.